Figure 1:
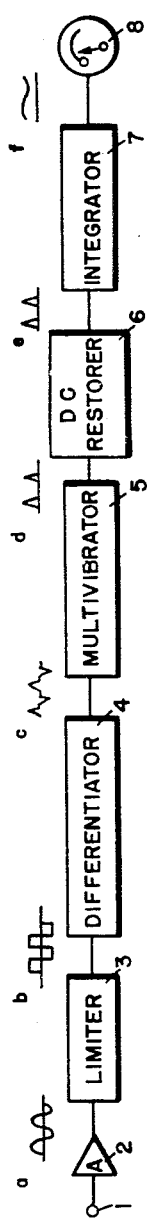

Oct. 11, 1960 G. R. PIERSON 2,956,227
FREQUENCY SENSITIVE DEVICE
Filed Sept. 19, 1956 2 Sheets-Sheet 1

*INVENTOR.*
GEORGE R. PIERSON
BY Lewis L. Humphries
ATTORNEY

United States Patent Office 2,956,227
Patented Oct. 11, 1960

2,956,227

FREQUENCY SENSITIVE DEVICE

George R. Pierson, Granada Hills, Calif., assignor to North American Aviation, Inc.

Filed Sept. 19, 1956, Ser. No. 610,844

4 Claims. (Cl. 324—78)

This invention relates to frequency responsive devices and more particularly to a device which produces a direct current analog signal directly proportional to the repetition rate of an electrical signal whose wave shape is varying in amplitude, width, or symmetry.

Electronic frequency meters measure the frequency of electrical oscillations or cyclically repeated voltage pulses and directly indicate the frequency on a suitable recording device. In some applications there is a need for a device which will measure the frequency or repetition rate of recurrent electrical signals which are varying in such a way that the wave shape of the voltage is changing in width, amplitude or symmetry about the voltage axis during the measuring period. The device which measures the frequency of these signals of random wave shapes would be accurate only if independent of amplitude, width, and symmetry of the input wave shape.

Frequency meters for measuring voltages of conventional wave shapes are well-known. However, these devices require a symmetrical wave shape input of constant width and amplitude, such as a sine wave, in order to measure the frequency with any reliable degree of accuracy. A random wave shape input requires special electronic circuits to correct for the errors induced in the measuring circuits when the wave shape is inserted in the input. In addition there is a lack of stability and linearity in the recording devices of known frequency measuring instruments.

The device of this invention provides an electronic frequency measuring device of simple construction and standard parts which produces an output signal proportional to the frequency of a random wave input which is independent of the amplitude, width, and symmetry of the input wave shape. A particular advantage of this circuit is the use of standard parts of reasonable accuracy which provide a highly accurate output that can be read from a standard meter or recorder of linear characteristics.

It is therefore an object of this invention to provide an improved frequency measuring device.

Another object of this invention is to provide a frequency measuring device independent of variations in amplitude of the input signal.

It is another object of this invention to provide a frequency responsive device which measures the frequency of a nonsymmetrical wave input.

It is still another object of this invention to provide a frequency measuring device which converts random frequencies and wave shapes into a direction current analog signal representing repetition rate and which is independent of input amplitude, width, and symmetry.

It is a further object of this invention to provide a frequency measuring device which converts a random wave A.-C. input into a D.-C. output which is linear with respect to the input frequency.

Figure 2:
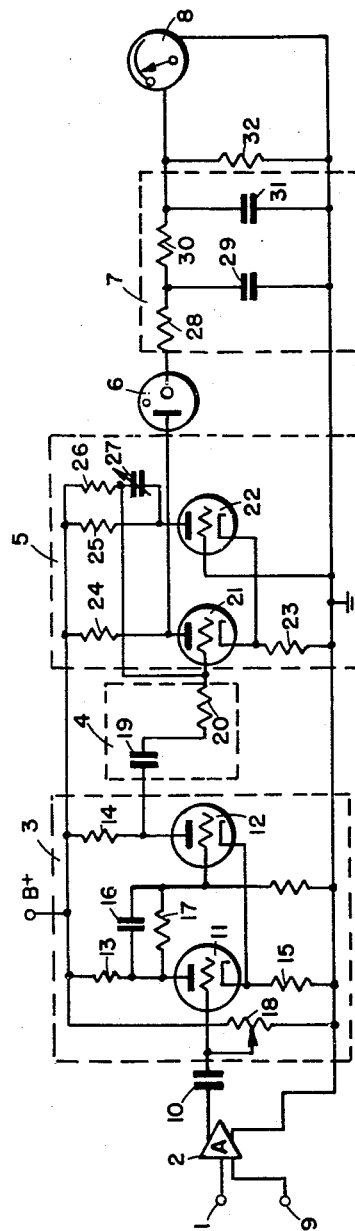
Figure 3:
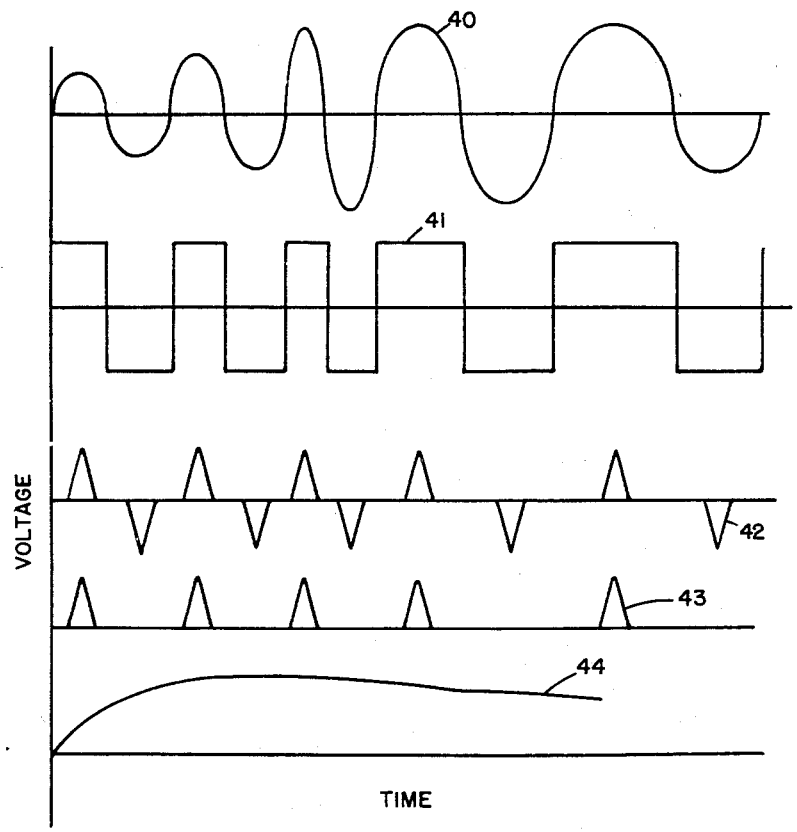

Other objects of invention will become apparent from the following description taken in connection with the accompanying drawings, in which Fig. 1 is a block diagram of the device of this invention;

Fig. 2 is a circuit diagram of the frequency measuring device embodying this invention;

And Fig. 3 is a graph of wave forms illustrating the operation of the system of Fig. 2.

Referring now to Fig. 1, the electronic frequency measuring device comprises a series of circuits shown in block diagram. The signals to be measured are applied to input terminal 1 which is connected to amplifier 2. The wave shapes accepted by terminal 1 may be of any wave shape or amplitude and may be nonsymmetrical about the voltage axis. Such a wave shape might be produced by a turbine type flow meter. Amplifier 2 strengthens the random wave signal received from terminal 1 and feeds the output into limiter 3 which converts the random wave to an essentially square wave of constant amplitude. Limiter 3 limits, or clips, the random wave to a predetermined voltage level in both the positive and negative direction of the wave. Differentiator 4 changes the alternate square waves produced by limiter 3 into trigger pulses of negligible width which are bidirectional and proportional in amplitude and number to the square wave output from limiter 3. Multivibrator 5 of the monostable type, having one stable state only, is triggered upon receipt of pulses in one direction only from differentiator 4. The output from multivibrator 5 is a series of short duration trigger pulses of the same polarity. D.-C. restorer 6 is connected to receive the pulse output from multivibrator 5 and couple these pulses to integrator 7. D.-C. restorer 6 is a constant voltage device which establishes a zero reference voltage for the output pulses from multivibrator 5. When an output pulse is received by a D.-C. restorer 6 from multivibrator 5 this pulse is coupled through circuit 6 to integrator 7 to charge a plurality of capacitors therein. Restorer 6 blocks conduction after the pulse disappears thereby preventing integrator 7 from discharging its capacitors through restorer 6 and multivibrator 5. When restorer 6 ceases conduction after receipt of a pulse which charges capacitors of integrator 7, the charge across the capacitors dissipates through an impedance in recorder 8 providing a D.-C. voltage signal on recorder 8 proportional to the repetition rate of the input signal received at terminal 1.

In operation, assuming an input voltage at terminal 1 of random wave form as shown by curve "a," the input voltage is clipped by limiter 3 to provide a substantially square wave of constant amplitude as indicated by wave form "b." Differentiator 4 converts the square wave form into bidirectional pulses of negligible width proportional in repetition to the frequency of the input signals to terminal 1 as indicated by wave form "c." Multivibrator 5 converts the bidirectional pulses into unidirectional pulses as shown by wave form "d." The unidirectional pulses at wave form "d" are coupled through D.-C. restorer 6 to integrator 7. The input to integrator 7 is a series of unidirectional pulses as shown by wave form "e." Integrator 7 measures the repetition of the input pulses indicated by wave form "e" and converts them to a D.-C. analog signal at recorder 8 as shown by wave form "f." This D.-C. analog signal is proportional to the repetition rate of the input signal at terminal 1 and is independent of wave shape thus providing an accurate measurement of the frequency of a random wave form.

Referring now to Fig. 2, a circuit diagram of the invention is shown. Amplifier 2, which may be of any standard low frequency low impedance A.-C. amplifier, has input terminals 1 and 9. The output of amplifier 2 is connected to the grid of triode 11 through coupling condenser 10. Triode 11 and triode 12 form a multivibrator which acts as a limiter 3 of Fig. 1. An alternating square wave is produced by limiter 3. The plate of triode 11 is connected through resistor 13 to a B+ supply which is also connected through resistor 14 to the plate of triode 12. Triodes 11 and 12 are cathode coupled through resistor 15 to ground. The plate of triode 11 is coupled to the grid of triode 12 through a circuit provided by capacitor 16 and resistor 17 connected in parallel. Variable resistor 18 connected between the B+ supply and ground and having a wiper connected to the grid of triode 11 provides for adjustment of the operating potential of triode 11.

Triode 11 is rendered conductive and triode 12 nonconductive by a positive going wave form impressed upon the grid of triode 11. A negative going wave form on the grid of triode 11 cuts triode 11 off and causes triode 12 to conduct. Depending upon the tendency of the random wave input to go more positive than negative or vice versa, either triode 11 or triode 12 may be made normally conductive. By adjusting the wiper on variable resistor 18 the voltage between the grid of triode 11 and ground may be varied. Adjusting the voltage on the grid of triode 11 to a point where normally this voltage is positive with respect to the cathode makes triode 11 normally conductive. adjusting the voltage so the grid potential is normally negative with respect to the cathode makes triode 11 normally nonconductive and triode 12 normally conductive. Thus, for example, if the input wave form at terminals 1 and 9 has a tendency to go more positive than negative, resistor 18 would be adjusted to make triode 11 normally conductive.

The square wave output from limiter 3 is taken from the plate of triode 12 and differentiated by capacitor 19 and connected through resistor 20 to the grid of triode 21. Triode 21 and triode 22 form a monostable multivibrator. Normally conducting triode 21 and triode 22 are cathode coupled through resistor 23 to ground. The plate of triode 21 is connected through resistor 24 to the B+ supply and the plate of triode 22 is connected through resistor 25 to the B+ supply. Resistor 26 and variable capacitor 27 connected in series between the B+ supply and the plate of triode 22 form a time constant charging device to vary the conduction time of triode 22. The action of this R-C circuit determines the width of the output pulse taken from the plate of triode 22. The predetermined value of capacitor 27 determines the frequency range of the device of this invention. By adjusting the value of capacitor 27 the amount of time triode 22 is conducting and triode 21 nonconducting can be varied. D.-C. restorer 6 is shown as a constant voltage discharge gas tube. The output pulse from the plate of triode 21 is fed to the plate of tube 6. The cathode of tube 6 is connected to resistor 28 of integrator 7. Resistor 28 and capacitor 29 along with resistor 30 and capacitor 31 form a charging circuit fed from the plate of triode 21 through tube 6. Resistor 32 is connected across capacitors 29 and 31 of integrator 7 to indicate the voltage produced by the integrated pulse as it leaks off through resistor 32 to ground. Recorder 8 which may be of any suitable recording device to measure or record voltage is connected across resistor 28 to measure the voltage produced by the integrated pulse as it discharges through resistor 32.

The time constants of the resistors and capacitors of integrator 7 are selected so that the charge on the capacitors never exceeds an amplitude great enough to cause nonlinearity. Limiter 3 and multivibrator 5 as shown consist of electron tubes with associated circuitry to produce multivibrator action. A number of other suitable multivibrators may be used in place of the circuits shown including transistor multivibrators.

In operation, taking the circuit diagram of the invention shown in Fig. 2 with reference to the curves as shown in Fig. 3, the wave form whose frequency is to be measured is applied to input terminals 1 and 9. The input wave form may be of any wave form including a random wave form as shown in curve 40 of Fig. 3 which is varying in width, amplitude, and symmetry about the voltage axis. Amplifier 2 operates in conventional manner and provides an amplifier output through condenser 10 to the grid of triode 11. Assuming triode 11 is nonconducting before the wave of curve 30 swings positive, at a predetermined positive voltage, triode 11 will commence induction lowering its plate voltage which, coupled through the grid of triode 12, causes triode 12 to cut off raising the voltage in the plate circuit of triode 12. Triode 11 remains conducting and triode 12 remains cut off until the wave form input to the grid of triode 11 reaches a predetermined negative voltage causing triode 11 to cut off. A rise in voltage at the plate of triode 11 coupled to the grid of triode 12 causes triode 12 to conduct lowering its plate voltage and triode 12 will conduct until the next positive swing of the random wave input to triode 11. The output from the plate of triode 12 as shown in curve 41 is of square wave symmetrical about the voltage axis, of constant amplitude, and proportional in width to the wave form of curve 30. The square wave produced by limiter 3 is differentiated by capacitor 19 to produce bidirectional pulses of negligible width and proportional in amplitude and frequency to the wave form of curves 40 and 41 as shown by curve 42. The differentiated pulses are fed through resistor 20 to the grid of triode 21. When a positive pulse is presented to triode 21 multivibrator 5 is unaffected because a positive pulse on the grid of triode 21 has no effect on the already conducting triode and no output will be emitted by the plate of triode 21. When a negative pulse is presented to triode 21, triode 21 is cut off by the bias on its resistor raising the voltage on the plate which is connected to the plate of constant voltage discharge tube 6. The positive voltage at the plate of tube 6 causes ionization and conduction in tube 6 charging capacitors 29 and 31 through resistors 28 and 30. During this time, triode 22 is conducting since the coupling from the cathode of triode 21 to the cathode of triode 22 causes the latter cathode to drop in potential thereby allowing conduction. Conduction in triode 22 will continue until capacitor 27, which was in a charged condition when triode 22 was nonconductive, discharges through triode 22 and resistor 23 to ground. When this occurs the voltage of the plate of triode 22 goes negative cutting off triode 22. When triode 22 ceases conduction the cathode of triode 21 is again of negative enough potential to allow triode 21 to conduct which lowers the potential at the plate of triode 21 thus causing constant discharge tube 6 to cease conduction. Thus, constant discharge tube 6 emits positive pulses when the plate of triode 21 is cut off as shown by curve 43. When discharge tube 6 is cut off, capacitors 29 and 31 are prevented from discharging through conducting triode 21 by the cut off discharge tube 6, and discharge instead through resistor 32 and ground. The current flowing through resistor 32 establishes a potential across the resistor which is the D.-C. analog of the frequency of input pulses to multivibrator 5. Recorder 8 indicates this D.-C. voltage as shown on curve 44 in Fig. 3.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A frequency measuring device comprising a bistable multivibrator for converting a source of alternating current of random wave form to a alternating current of substantially square wave form, differentiating circuit responsive to the output from said bistable multivibrator for converting the square wave output of said bistable multivibrator to bidirectional pulses of short width, a monostable multivibrator comprising a pair of electronic valves each having an anode, a cathode and a control element, cross coupling means between the cathodes of said electronic valves to condition said valves for monostable operation whereby one valve is normally conductive and the other valve is normally nonconductive, the control element of said normally conductive valve connected to the output of said differentiator whereby said normally conductive valve remains conductive upon the receipt of pulses of one polarity from said differentiator and becomes nonconductive upon the receipt of pulses of the opposite polarity from said differentiator, a time constant circuit connected to control said normally nonconductive valve whereby said normally nonconductive valve will conduct for a time determined by said time constant after said normally conductive valve has become nonconductive, at the end of which time said normally conductive valve conducts again, a normally nonconductive gas discharge device connected to the output of said normally conductive electronic valve to be conductive when said normally conductive electronic valve is nonconductive, an R.-C. integrator circuit having a plurality of capacitors and resistors connected to said gas discharge device, said gas discharge device being effective when conductive to cause said plurality of capacitors to charge through said normally conductive electronic valve and effective when nonconductive to permit said capacitor from discharging through said normally conductive electronic valve.

2. Claim 1 as described wherein said time constant circuit comprises a capacitor connected to the anode of said normally nonconductive electronic valve to control the potential at the anode of said normally nonconductive electronic valve whereby said normally nonconductive electronic valve will conduct until said capacitor dissipates its charge.

3. Claim 1 as described wherein is included impedance means connected across said integrator circuit to discharge said plurality of capacitors when said gas discharge device is nonconductive, the current through said impedance means being directly proportional to the frequency of said source of alternating current.

4. In a frequency measuring device the combination of a bistable multivibrator responsive to a source of alternating current of random waveform, the output of said bistable multivibrator being of substantially square waveform, a differentiating circuit coupled to the output of said bistable multivibrator, the output of said differentrating circuit being bidirectional trigger pulses of short width, a monostable multivibrator comprising a pair of electronic valves each having an anode, a cathode and a control electrode, cross connecting means between said electronic valves to condition said valves for monostable multivibrator operation whereby one valve is normally conductive and the other valve is normally nonconductive, said normally conductive valve nonconductive upon receiving a pulse of one polarity from the output of said differentiating circuit, the output of said monostable multivibrator being taken from said normally conductive valve when nonconductive, the output of said monostable multivibrator being unidirectional trigger pulses of constant amplitude, a normally nonconductive gas discharge device connected to the output of said monostable multivibrator to be conductive when said monostable multivibrator receives a trigger pulse, capacitor means connected to said gas discharge device to be charged in response to said trigger pulses, said gas discharge device being effective when conductive to cause said capacitor means to charge through said monostable multivibrator and effective when nonconductive to prevent said capacitor means from discharging through said monostable multivibrator, and analog counting means responsive to said capacitor means for counting the number of output pulses from said monostable multivibrator.

References Cited in the file of this patent
UNITED STATES PATENTS

| | | |
|---|---|---|
| 2,226,185 | Sturm | Dec. 24, 1940 |
| 2,232,959 | Miller | Feb. 25, 1941 |
| 2,260,933 | Cooper | Oct. 28, 1941 |
| 2,352,082 | De Rosa | June 20, 1944 |
| 2,467,777 | Rajchman | Apr. 19, 1949 |
| 2,495,072 | Molloy | Jan. 17, 1950 |
| 2,510,381 | Cushing | June 6, 1950 |
| 2,570,442 | Grosdoff | Oct. 9, 1951 |
| 2,613,071 | Hansel | Oct. 7, 1952 |
| 2,629,008 | Lynch | Feb. 17, 1953 |
| 2,720,584 | Sloughter | Oct. 11, 1955 |
| 2,732,494 | Hall | Jan. 24, 1956 |
| 2,767,582 | Bartelink | Oct. 23, 1956 |
| 2,784,910 | Ghiorso et al. | Mar. 12, 1957 |
| 2,796,533 | Morton et al. | June 18, 1957 |
| 2,845,579 | Logan | July 29, 1958 |
| 2,863,052 | Fraser | Dec. 2, 1958 |
| 2,867,767 | McGillem | Jan. 6, 1959 |

OTHER REFERENCES

Official Gazette (abstract of application 665,998 to Cohen), vol. 630, page 1319, Jan. 31, 1950.